United States Patent [19]

Tinkelenberg et al.

[11] 4,362,827

[45] Dec. 7, 1982

[54] MANUFACTURE OF CHIPBOARD

[75] Inventors: Arie Tinkelenberg, Limbricht; Henricus W. L. M. Vaessen, Wijnandsrade; Kwai W. Suen, Geleen, all of Netherlands

[73] Assignees: Methanol Chemic Nederland V.O.F., Delfzijl; Stamicarbon B.V., Geleen, both of Netherlands

[21] Appl. No.: 183,409

[22] Filed: Sep. 3, 1980

[30] Foreign Application Priority Data

Sep. 11, 1979 [NL] Netherlands .......................... 7906751

[51] Int. Cl.$^3$ ........................ C08L 1/02; C08L 61/24; C08L 61/34
[52] U.S. Cl. .......................................... 524/9; 524/13; 524/15; 524/16; 524/35; 525/509; 528/68
[58] Field of Search ...................... 525/509; 260/17.3; 524/35, 9, 13, 15, 16

[56] References Cited

U.S. PATENT DOCUMENTS

| | | | |
|---|---|---|---|
| 2,349,756 | 5/1944 | Pratt | 525/509 |
| 3,268,467 | 8/1966 | Rye et al. | 525/509 |
| 3,870,665 | 3/1975 | Diehr et al. | 260/17.3 |
| 4,282,119 | 8/1981 | Tinkelenberg et al. | 260/17.3 |

*Primary Examiner*—Wilbert J. Briggs, Sr.

[57] ABSTRACT

The invention concerns the production of particle board with a very substantially lowered formaldehyde emission as well as suitable binding agents. According to the invention the binding agent used in the production of the board is a combination of a polyisocyanate with a aminoplast resin containing 0.25 to 0.625 moles of formaldehyde per mole equivalent of aminogroups. The particle boards thus obtained possess satisfactory mechanical properties and a strongly reduced formaldehyde emission.

10 Claims, No Drawings

MANUFACTURE OF CHIPBOARD

The invention relates to a process for the manufacture of board material with a very substantially lowered formaldehyde emission, as well as of relevant suitable bonding agents.

It is known that board sheets can be manufactured by compression of cellulose-containing material with urea-formaldehyde or urea melamine formaldehyde resin as bonding agent. However, fibre board or chipboard produced in this manner emits minor quantities of formaldehyde into the air for a very long time. The formaldehyde emission from the board material can be reduced by lowering the quantity of formaldehyde relative to the amino compounds in the adhesive. It has been found, though, that this lowering of the formaldehyde content of the adhesive is subject to certain limits because it leads to reduced strength properties of the board. For weather-resistant board bonded with urea melamine formaldehyde, it has been found, for instance, that the weather resistance, measured as the V-100 tensile strength in accordance with DIN 68763, is in most cases still acceptable if the formaldehyde content, in terms of moles of formaldehyde per mole equivalent of amino group ($F/NH_2$) is at least 0.65 and preferably at least 0.75. If an adhesive with an $F/NH_2$ molar ratio lower than 0.65 is used, a strongly decreased V-100 value is found. An $F/NH_2$ molar ratio of 0.65 is regarded as a limit value, below which the V-100 value decreases very strongly and it is impossible in practice to obtain weather-resistant chipboard of good quality. For board which is used under dry conditions only, it is still possible to use adhesive with $F/NH_2$ molar ratios down to 0.625, although in this case, too, it is customary to use an $F/NH_2$ ratio of 0.7. It has also been proposed already to make weather-resistant chipboard which does not emit formaldehyde by using polyisocyanate as bonding agent in order to obtain weather-resistant chipboard. The drawbacks of this procedure are the high cost price of the bonding agent and the problems arising in the compression process. It has also been proposed already by way of compromise to use both an aminoplast resin and a polyisocyanate as bonding agents in order to obtain chipboard with the lowest possible cost of bonding agent. Since in that case the usual urea melamine formaldehyde resins are used, the problem of formaldehyde emission remains.

The object of the invention is the manufacture of chipboard or other shaped objects with very low formaldehyde emission and yet of sufficient strength.

According to the invention, chipboard or shaped objects is/are manufactured by hardening at elevated temperature and pressure of lignocellulose-containing chip material with a polyisocyanate and an aminoplast resin as bonding agents, the aminoplast resin, containing 0.25 to 0.625 mole of formaldehyde per mole equivalent of amino groups, being used in a quantity of between 3 and 14% by wt. relative to the chip material, and the polyisocyanate in a quantity of between 0.5 and 3% by wt. relative to the chip material.

It is found that the use of such a bonding agent combination permits of reducing the $F/NH_2$ molar ratio to a much lower level than is usual, without substantial deterioration of the mechanical properties of the final product.

With this method, board material can be obtained which combines a very low formaldehyde emission level with favorable strength properties. The price of the bonding agent system per $m^3$ of chipboard is about equal to or a little lower than the prices of the known bonding agents. The method is suitable for production of chipboard for dry applications as well as for production of 'limited weather resistant' chipboard. Essential to the invention is the use of an aminoplast resin on the basis of formaldehyde, urea and optionally melamine, in which the molar ratio between formaldehyde and amino groups (to be referred to hereinafter as the $F/NH_2$ ratio) is lower than that in the normally applied aminoplast adhesives.

For the manufacture of chipboard which is not exposed to moisture, a pure urea formaldehyde resin or urea melamine formaldehyde resin with a low melamine content may be used. The use of a small quantity of melamine has a favorable effect on the reactivity of the resin. The aminoplast adhesive for this application will generally have a melamine content of not more than 25% by wt. relative to the quantity of melamine plus urea. The $F/NH_2$ ratio in this mode of realization is preferably between 0.40 and 0.60, more in particular between 0.45 and 0.55. With increasing $F/NH_2$ ratio, the strength increases, but the formaldehyde emission also increases.

The method according to the invention is particularly suitable for the manufacture of chipboard which is resistant against the effects of moisture and weather influences. In this mode of realization, a urea melamine formaldehyde resin is used which contains between 25 and 70% by wt. of melamine relative to the quantity of melamine plus urea. The $F/NH_2$ ratio may be between 0.25 and 0.625. Favorable combinations of low formaldehyde emission and good strength are obtained notably with an $F/NH_2$ ratio of between 0.35 and 0.55, more in particular between 0.40 and 0.50. If the formaldehyde emission is not a very critical factor, a higher ratio may also be used, for instance 0.60. The melamine content is preferably between 40 and 60% by wt.

In the mode of realization for manufacture of non-weather-resistant, the aminoplast resin may be used in a quantity of between 3 and 7% by wt. (solids weight) relative to the air-dry chips. In the mode of realization for manufacture of 'limited weather-resistant' board, the adhesive content is preferably between 7 and 12% by wt. A higher adhesive content is possible, but offers little advantage while adding to the costs of manufacture.

The aminoplast bonding agent may be prepared by adding an extra quantity of urea to a normally applied urea formaldehyde resin or urea melamine formaldehyde resin, with an $F/NH_2$ ratio of for instance between 0.8 and 0.65, or by mixing a melamine-formaldehyde resin with a urea (melamine) formaldehyde resin and adding urea to reach the desired $F/NH_2$ ratio. It is also possible to add the urea, which is required to obtain a low $F/NH_2$ ratio, entirely or in part to the chips separately, if desired in admixture with the polyisocyanate or with other additives. If so desired, the aminoplast resin may be modified through incorporation of a phenolic compound or through mixing with a phenol-formaldehyde resin. Other aminoplast-forming compounds in minor quantities may also be used, such as dicyandiamide, thiourea, biuret, guanidine, ammonia, etc. The effective $F/NH_2$ ratio is calculated on the basis of the quantity of amino groups applied in the form of aminoplast-forming compounds. Besides formaldehyde, minor quantities of another aldehyde such as acetaldehyde, isobutyraldehyde, crotonaldehyde or benzaldehyde may have been taken up in the resin.

The aminoplast adhesive solutions on the basis of formaldehyde, urea and, if desired, up to 70% by wt. of melamine relative to the quantity of melamine plus urea, in which between 0.25 and 0.625 mole of formaldehyde has been taken up, are novel products. Preferably, less than 0.55, in particular less than 0.50, mole of formaldehyde is used per mole equivalent of amino radicals. These adhesives are used for the manufacture of chipboard with a particularly low formaldehyde emission. The preparation of these adhesives, as indicated above, is very simple and does not require novel technology. It seems that these adhesives have a higher storage stability than similar adhesives with a higher formaldehyde content. For the preparation of weather-resistant odourless chipboard, adhesives with a melamine content of between 25 and 70% by wt. relative to melamine plus urea and an $F/NH_2$ ratio of between 0.40 and 0.50 are suitable in particular.

The normally used admixtures, such as moisture repellants, antifoaming agents, fungicides or other agents inhibiting microbial decomposition, may be added to the resin solution and/or the material to be bonded. The resin solution is diluted with water, if necessary, to such a degree that it becomes properly sprayable. The resin content is then mostly 50 to 60% by weight. A hardening catalyst is also added to the resin. Mostly this is a latent catalyst, ammonium chloride for instance, optionally in combination with ammonia or an acid.

The polyisocyanate used may be a compound with two or more isocyanate groups per molecule or a prepolymer derived therefrom, or a derivative with blocked isocyanate groups. Examples are toluene diisocyanate, hexamethylene diisocyanate, isophorone diisocyanate, etc. Advantageously, the low-priced diphenylmethane diisocyanate (MDI) or polyarylene polyisocyanate (PAPI) may be used in non-purified form. The polyisocyanate may be mixed with the aminoplast resin solution or may be applied separately as a liquid, dissolved or as an aqueous emulsion. The quantity of polyisocyanate used generally amounts to between 0.5 and 3.0% by weight relative to the air-dry chipmaterials. Larger quantities are less desirable because they increase the cost price of the chipboard and may give rise to problems in the board compression process (sticking to press plates). In the vast majority of cases, good results are obtained with application of 0.5 to 2.0% by weight of polyisocyanate, in particular about 1.0% by weight.

Manufacture of the board material takes place in a known manner. The cellulose-containing material, such as wood chips and fibers, is sprayed with the resin solution and formed into a chip mat by spreading it on a suitable substrate. The polyisocyanate is applied either mixed with the resin solution or separately before, during or after application of the aminoplast resin. It seems that application of the isocyanate prior to application of the aminoplast resin offers the advantage of better control of the adhesive contents of the various chip fractions as the chip mat is spread out with the 'Wind-Sicht' equipment. The chip mat is then densified and hardened in the usual manner at a temperature of between 150° and 200° C. and a maximum pressure of about 3.5 $N/mm^2$. For a more detailed description of current methods, reference may be made to, for instance, 'Technologie der Spanplatten' by H. J. Deppe and K. Ernst, Stuttgart 1964. The press plates may optionally be provided with a release agent. The process according to the invention may be used for the production of chipboard of homogeneous structure across the thickness as well as chipboard with a layered structure. In the latter case the layers may contain different amounts of binding agents. Although it is possible to use the aminoplast resin as the sole binding agent in the outer layers, it is clearly preferred to use the combination of aminoplast resin and polyisocyanate as binding agents for each layer.

The invention will now be elucidated by means of the following examples, without being restricted to the different embodiments described therein.

EXAMPLE I

Preparation of a Few Adhesive Resin Solutions

Various types of chipboard adhesive were prepared from the following components:
(a) A melamine formaldehyde resin solution with a molar formaldehyde to melamine ratio of 1.6. This solution had been obtained by reacting melamine and formaldehyde in the usual manner at a pH higher than 9 and a temperature of 95° to 98° C. until a water dilutibility of about 1:1 (g of water per g of dissolved resin at 20° C.) had been reached, with subsequent evaporation under reduced pressure to a solids content of about 60% by weight.
(b) A commercially available urea-formaldehyde resin solution with a molar formaldehyde to urea ratio of 1.25 (the commercial product UF-6 SGA of Methanol Chemie Nederland).
(c) Urea By mixing of the components (a), (b) and (c) in different proportions, the adhesive solutions A to E were obtained. The mixing was readily effected by adding the components (b) and (c) To component (c) during the cooling. These adhesive contained 38.6% by weight of melamine, relative to melamine plus urea, with $F/NH_2$ ratios of between 0.325 and 0.50.

EXAMPLE II

Manufacture of Chipboard

Using the adhesive solutions obtained as described in example I and diphenylmethane diisocyanate (MDI) as bonding agents, chip board sheets were manufactured, for the rest in the usual manner. The adhesive solutions were mixed with an accelerator system (1.5% by weight of ammonium chloride and, depending on the $F/NH_2$ ratio, up to 0.5% by weight of 25% ammonia or up to 2% by weight of 10 N hydrochloric acid, the percentages relating to the resin solids weight) and a moisture repellant (0.6% by weight of Mobilcer paraffin emulsion, relative to the dry chip weight), and diluted with water down to the viscosity required for spraying. In the test series I the isocyanate was emulsified in the adhesive solution after which the mixture was sprayed on the chips. In test series II the adhesive solution and the isocyanate were sprayed separately.

The chip board was manufactured by spraying dust-free chips (70% weight fir, 30% by weight beech) with the bonding agents in a suitable mixer and then spreading them out into a mat which at a pressing temperature of 180° C., with a maximum compression force of 3.4 $N/mm^2$ and a pressing time of about 4 minutes, was compressed into sheets of 40×40 cm, with a thickness of 16 mm and a density of about 700 $kg/m^3$.

The tensile strength of the sheets normal to the sheet surface after submersion for 2 hours in boiling water (V-100 tensile strength) was measured in accordance with DIN 68763. The formaldehyde emission of the sheets was determined in accordance with the modified DSM/WKI (Roffael) method. In this method, a chip board sample is suspended over a saturated solution of common salt in a well sealed bottle at a temperature of 40° C. The salt solution is renewed at subsequent intervals of 24,24,120,24 and 24 hours. The total quantity of formaldehyde absorbed into the salt solutions is determined and translated into mg of formaldehyde per m² of chip board. The composition of the adhesives, the quantity of bonding agent used, relative to the dry ('atro') chip material, and the strength and the formaldehyde emission of the chip board sheets have been summarized in table 1, series I and II.

EXAMPLE III

Comparative Example

For the purpose of comparison, chip board was manufactured with bonding agents and bonding agent combinations which are outside the scope of the invention in test series III. The conditions and the results are shown in table 1, series III.

The table pertaining to the examples clearly shows that with the current types of UMF adhesive (resin types S and T), the use of a combination of isocyanate and UMF adhesive, instead of only UMF adhesive, results in a negligible difference in the V-100 tensile strength and only a minor decrease in the formaldehyde emission. With the novel types of UMF adhesive, with low F/NH$_2$ ratios, the strength of the chipboard sheets appears to be surprisingly high when a combination of isocyanate and UMF adhesive is used as a bonding agent instead of only the UMF adhesive.

EXAMPLE IV

Some formaldehyde aminoplast resin adhesives with different melamine contents relative to the quantity of melamine plus urea, and with different F/NH$_2$ ratios were prepared in the manner described in example I. The resins were used as bonding agent for chip board, in combination with MDI, as described in example II, a mixture of the MDI and the aminoplast resin being sprayed on the chips. For the purpose of comparison, other chipboard sheets were manufactured in which only aminoplasts were used as bonding agent. The results are shown in table II.

TABLE I

| test series | | UMF type | F/NH$_2$ ratio | adhesive content wt. % rel. to chips UMF | MDI | tensile strength V-100 N/mm² | F-emission (Roffael) mg/m² × 10$^{-2}$ |
|---|---|---|---|---|---|---|---|
| I | 6 | A | 0.50 | 12 | 0.5 | 0.2 | 4 |
| | 7 | A | 0.50 | 10 | 1 | 0.25 | 4 |
| | 15 | C | 0.40 | 12 | 0.5 | 0.1 | 1 |
| | 16 | C | 0.40 | 10 | 1 | 0.2 | 1 |
| | 17 | C | 0.40 | 8 | 2 | 0.2 | 1 |
| | 22 | E | 0.325 | 10 | 1 | 0.15 | unknown |
| II | 8 | A | 0.50 | 12 | 0.5 | 0.25 | 4 |
| | 9 | A | 0.50 | 10 | 1 | 0.3 | 4 |
| | 11 | B | 0.45 | 12 | 0.5 | 0.2 | 2 |
| | 12 | B | 0.45 | 10 | 1 | 0.3 | 2 |
| | 13 | B | 0.45 | 8 | 2 | 0.25 | 2 |
| | 18 | C | 0.40 | 12 | 0.5 | 0.1 | 1 |
| | 19 | C | 0.40 | 10 | 1 | 0.25 | 1 |
| | 21 | D | 0.35 | 10 | 1 | 0.2 | 0.5 |
| III* | 1 | S** | 0.80 | 14 | — | 0.35 | 50 |
| | 2 | S | 0.80 | 10 | 1 | 0.35 | 40 |
| | 3 | T** | 0.65 | 14 | — | 0.3 | 17 |
| | 4 | T | 0.65 | 10 | 1 | 0.3 | 15 |
| | 5 | A | 0.50 | 14 | — | 0.1 | 4 |
| | 10 | B | 0.45 | 14 | — | 0.05 | 2 |
| | 14 | C | 0.40 | 14 | — | 0 | 1 |
| | 20 | D | 0.35 | 14 | — | 0 | 0.5 |

*comparative test series
**commercially available types of UMF adhesive of Methanol Chemie Nederland

TABLE II

| test-series | | UMF type | content of M, % | F/NH$_2$ ratio | adhesive content wt. % rel. to chips UMF | MDI | tensile strength V-100 N/mm² |
|---|---|---|---|---|---|---|---|
| IV | 23 | F | 45 | 0.45 | 10 | 1 | 0.28 |
| | 24 | G | 45 | 0.40 | 10 | 1 | 0.25 |
| | 25 | H | 45 | 0.325 | 10 | 1 | 0.20 |
| | 26 | I | 45 | 0.275 | 10 | 1 | 0.15 |
| | 27 | K | 50 | 0.45 | 9 | 1 | 0.30 |
| | 28 | L | 60 | 0.45 | 8 | 1 | 0.27 |
| IV* | 29 | F | 45 | 0.45 | 14 | — | 0.13 |
| | 30 | G | 45 | 0.40 | 14 | — | 0.10 |
| | 31 | H | 45 | 0.325 | 14 | — | 0 |
| | 32 | I | 45 | 0.275 | 14 | — | 0 |
| | 33 | K | 50 | 0.45 | 13 | — | 0.15 |

EXAMPLE V

Urea-formaldehyde resin adhesives M and N were prepared by mixing components (b) and (c), described in example I, in different ratios. These adhesives were used in combination with MDI as binding agents in the production of particle board as described in example II. A mixture of MDI and the resin solution was sprayed on the dust-free chips (30% by wt. fir, 70% by wt. beech). The particle board thus obtained is of the type suitable for dry indoor applications. The mechanical properties were determined according to DIN 68763. The results are set out in table III.

For comparison, boards were produced by the same method but now using the aminoplast resin as the sole binding agent. Results of these experiments are also set out in table III.

TABLE III

| series test | | UF type | F/NH$_2$ ratio | adhesive content % by wt on chips UF | MDI | tensile strength V-20 N/mm² | flexural strength N/mm² |
|---|---|---|---|---|---|---|---|
| V | 34 | M | 0.55 | 4 | 1 | 0.6 | 19 |
| | 35 | N | 0.45 | 4 | 1 | 0.4 | 17 |
| | 36 | N | 0.45 | 6.5 | 0.5 | 0.5 | 18 |
| | 37 | N | 0.45 | 7 | 1 | 0.6 | 18 |
| V* | 40 | V** | 0.625 | 9 | — | 0.6 | 19 |
| | 38 | M | 0.55 | 9 | — | 0.5 | 16 |
| | 39 | N | 0.45 | 9 | — | 0.1 | 9 |

*comparative test series, not according to the invention
**commercially available UF-resin adhesive (UF-6 SGA)

We claim:
1. A method for manufacturing chipboard or shaped objects by hardening at elevated temperatures and pressures lignocellulose-containing chip material with a polyisocyanate and aminoplast resin bonding agents, wherein an aminoplast resin having between 0.25 to 0.625 mole of formaldehyde per mole equivalent of amino groups is used in a quantity between 3% and 14% by weight relative to said chip material in combination with a polyisocyanate, which polyisocyanate is used in a quantity between 0.5% and 3.0% by weight relative to said chip material.

2. A method according to claim 1, wherein an aminoplast resin based on formaldehyde, urea and melamine having an $F/NH_2$ molar ratio of between 0.40 and 0.60 is employed in a quantity between 0.0% to 25% by weight of melamine relative to the quantity of melamine plus urea.

3. A method according to claim 2, wherein said aminoplast resin has an $F/NH_2$ molar ratio between 0.45 and 0.55.

4. A method according to claim 1, wherein an aminoplast resin based on formaldehyde, urea and melamine having an $F/NH_2$ molar ratio between 0.25 and 0.625 and containing 25% to 70% by weight of melamine relative to melamine plus urea is employed in a quantity between 7% and 12% by weight relative to said chip material.

5. A method according to claim 4, wherein said aminoplast resin has an $F/NH_2$ molar ratio between 0.35 and 0.55.

6. A method according to claim 4 or 5, wherein said aminoplast resin contains between 40% and 60% by weight of melamine relative to melamine plus urea.

7. A method according to claim 1, 2, 3, 4 or 5 wherein said polyisocyanate is used in a quantity between 0.5% and 2.0% by weight relative to said chip material.

8. A chipboard manufactured by application of the method according to claim 1, 2, 3, 4 or 5.

9. Aminoplast adhesive solution based on formaldehyde, urea and 0% to 70% by weight of melamine, relative to the quantity of melamine plus urea, wherein said adhesive contains between 0.25 and 0.625 mole of formaldehyde per mole equivalent of amino group.

10. Aminoplast adhesive solution according to claim 9, wherein the melamine content is between 40% and 60% by weight relative to the quantity of melamine plus urea such that between 0.40 and 0.50 mole of formaldehyde has been taken up per mole equivalent of amino group.

* * * * *